United States Patent
Puthenpura et al.

(10) Patent No.: US 8,593,952 B2
(45) Date of Patent: Nov. 26, 2013

(54) METHOD AND APPARATUS FOR LOCATING A WI-FI HOTSPOT FOR OFFLOADING WIRELESS TRAFFIC

(75) Inventors: Sarat Puthenpura, Berkeley Heights, NJ (US); David G. Belanger, Hillsborough, NJ (US); Sam Houston Parker, Cranbury, NJ (US); Ravi Raina, North Brunswick, NJ (US); Gopalakrishnan Meempat, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 315 days.

(21) Appl. No.: 12/942,758

(22) Filed: Nov. 9, 2010

(65) Prior Publication Data
US 2012/0113965 A1 May 10, 2012

(51) Int. Cl.
*H04W 4/00* (2009.01)
*H04W 72/00* (2009.01)

(52) U.S. Cl.
USPC ........ 370/230; 370/252; 370/328; 455/452.1; 455/453

(58) Field of Classification Search
USPC ......... 370/229–232, 235, 252, 253, 328–332, 370/468; 455/436, 440, 441, 450–454
See application file for complete search history.

(56) References Cited

U.S. PATENT DOCUMENTS

| | | | |
|---|---|---|---|
| 6,778,496 B1* | 8/2004 | Meempat et al. | 370/230 |
| 6,904,017 B1* | 6/2005 | Meempat et al. | 370/238 |
| 8,364,155 B1* | 1/2013 | Ahmed et al. | 455/446 |
| 2007/0248033 A1* | 10/2007 | Bejerano et al. | 370/318 |
| 2008/0188244 A1* | 8/2008 | Mazlum et al. | 455/456.6 |
| 2009/0285159 A1* | 11/2009 | Rezaiifar et al. | 370/328 |
| 2011/0258313 A1* | 10/2011 | Mallik et al. | 709/224 |
| 2011/0320588 A1* | 12/2011 | Raleigh | 709/224 |
| 2012/0015649 A1* | 1/2012 | Li et al. | 455/434 |
| 2012/0094666 A1* | 4/2012 | Awoniyi et al. | 455/435.1 |

* cited by examiner

Primary Examiner — Kerri Rose (57) ABSTRACT

A method and apparatus for locating a Wi-Fi hotspot for offloading wireless traffic from a cellular network are disclosed. For example, the method obtains network traffic data for the second type of wireless access network for a geographical area, and obtains a list of sectors in the geographical area. The method selects at least one sector from the list of sectors to be relieved, and determines a geographical range for the at least one sector. The method then obtains at least one hotspot of the first type of wireless access network within the geographical range, wherein the at least one hotspot is a potential location for offloading the wireless traffic from the second type of wireless access network.

17 Claims, 5 Drawing Sheets

METHOD AND APPARATUS FOR LOCATING A WI-FI HOTSPOT FOR OFFLOADING WIRELESS TRAFFIC

The present disclosure relates generally to communication networks and, more particularly, to a method and apparatus for locating a Wireless Fidelity (Wi-Fi) hotspot for offloading wireless traffic, e.g., cellular traffic.

BACKGROUND

As Internet usage continues to grow, more and more customers are accessing communications services via a mobile device, e.g., a cell phone, a smart phone, etc. For example, a customer may receive multimedia content via his/her cell phone. The cell phone transmits and receives voice and data packets to and from the service provider's network via a base station and an access network.

The customer's ability to access services via a wireless device is dependent on the availability of capacity on various network elements, e.g., radio access networks, cell site equipment, and so on. The service provider may forecast the demand for the cell sites and/or radio access networks. Equipment such as antennas, base stations, backhaul equipment, and the like are then deployed accordingly.

As usage of the cellular network grows, the service provider may use the forecast data to periodically expand the network. In order to keep up with the demand, the expansion of cellular networks requires tremendous capital infusion.

SUMMARY OF THE DISCLOSURE

In one embodiment, the present disclosure teaches a method and apparatus for locating a Wi-Fi hotspot for offloading wireless traffic, e.g., cellular traffic, from a cellular network. For example, the method obtains network traffic data for the second type of wireless access network for a geographical area, and obtains a list of sectors in the geographical area. The method selects at least one sector from the list of sectors to be relieved, and determines a geographical range for the at least one sector. The method then obtains at least one hotspot of the first type of wireless access network within the geographical range, wherein the at least one hotspot is a potential location for offloading the wireless traffic from the second type of wireless access network.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for locating a Wi-Fi hotspot for offloading wireless traffic, e.g., cellular traffic, in a network, e.g., a 3G network and the like. Although the teachings of the present disclosure are discussed below in the context of a wireless network, the teaching is not so limited. Namely, the teachings of the present disclosure can be applied for other types of networks, wherein offloading of traffic from a first type of wireless network (e.g., a cellular network) to another type of wireless network (e.g., a Wi-Fi network) is beneficial.

Figure 1:
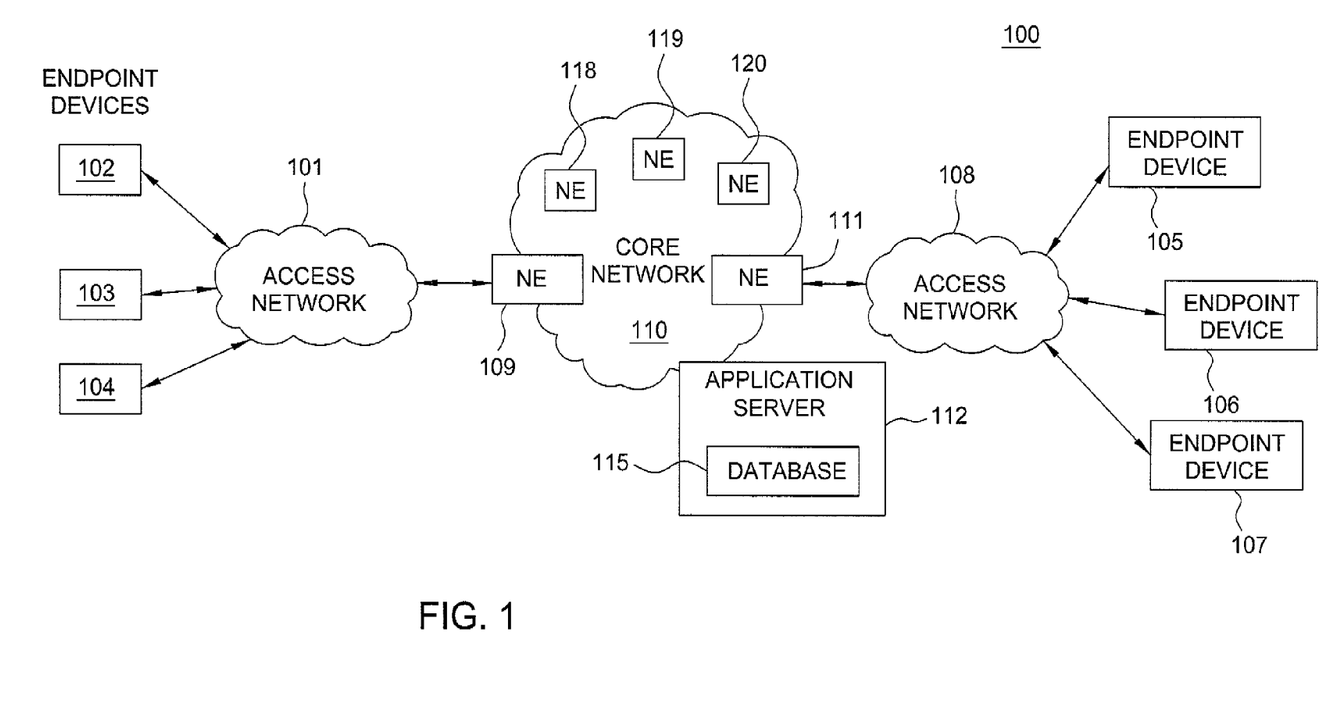
FIG. 1 is a block diagram depicting an illustrative network related to the current disclosure.

FIG. 1 is a block diagram depicting an illustrative network 100 related to the current disclosure. Illustrative networks may include Internet protocol (IP) networks, Ethernet networks, wireless networks, cellular networks, and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a cellular network, a Wi-Fi network, a $3^{rd}$ party network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g., voice and data services, are transmitted on networks.

In one embodiment, a service provider may enable customers to access services via a wireless access network. For example, a customer may use a cell phone to access Internet Protocol (IP) services, multimedia services, and the like. The packets from and to the wireless device, e.g., a cell phone or a smart phone, may then traverse one or more radio access networks and equipment, e.g., base stations, backhaul equipment, etc.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The base station may also be referred to as a three sector base station.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized. In order to more clearly illustrate the disclosure, the concept of a traffic circle will first be described.

A traffic circle refers to a circular approximation of the geographical range of a sector. The coverage area (geographical range) of a sector may depend on a number of factors, e.g., frequency band, terrain, antenna height, antenna tilt, antenna azimuth, transmitted power level, etc. The traffic circle may be visualized as being a circle on the ground below the antenna in a base station, covering the geographical range for the antenna sector.

Figure 2:
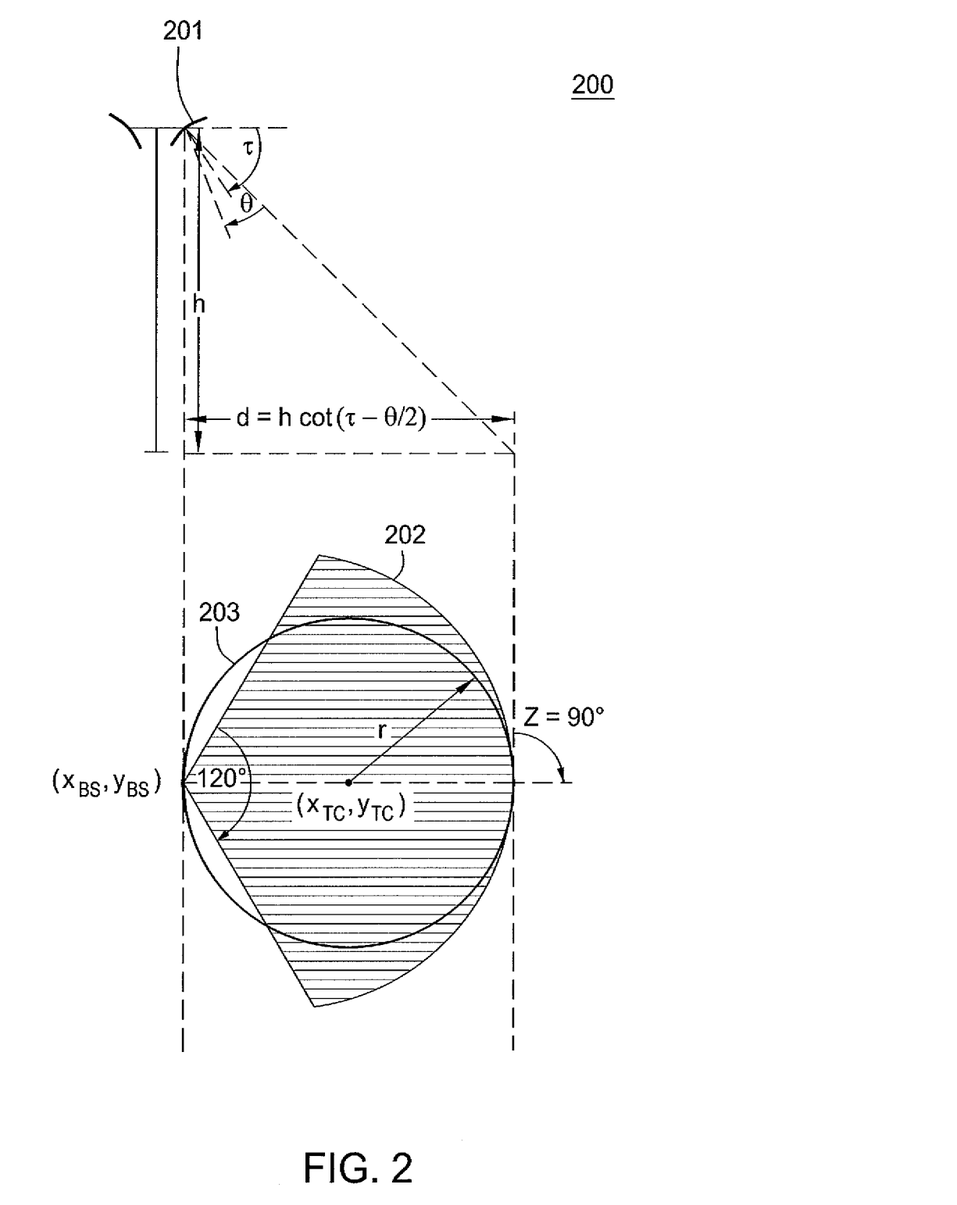
FIG. 2 provides an exemplary illustration of a traffic circle for an antenna of the current disclosure.

FIG. 2 provides an exemplary illustration 200 of a traffic circle for an antenna of the current disclosure. The exemplary illustration 200 is that of an antenna 201. The antenna 201 has a geographical range 202 which may be approximated by the traffic circle 203. The physical characteristics of the antenna 201 are denoted as follows:

τ: Tilt angle of the antenna;
θ: Vertical beam width of the antenna;
h: Height of the antenna;
d: Geographical range of the sector in the base station;
Z: Azimuth of the antenna (90 degree in this example);
$(X_{BS}, Y_{BS})$: Cartesian coordinate location of the antenna in the base station; and
$(X_{TC}, Y_{TC})$: Cartesian coordinate location of the center of the traffic circle.

The radius of the traffic circle r is then:

$$r = \frac{d}{2}, \text{ wherein } d = h\text{Cot}(\tau - \theta/2). \quad (1)$$

For example, for an antenna with h=60 meters, z=7.6°, θ=1°, then, d=482 meters and r=241 meters.

The Cartesian coordinate location of the center of the traffic circle is determined using the following equations:

$$X_{TC} = X_{BS} + (d \sin Z)/2 \quad (2)$$

$$Y_{TC} = X_{BS} + (d \cos Z)/2 \quad (3)$$

$(X_{TC}, Y_{TC}, r)$ denotes the circular coordinate of the sector. $\quad (4)$ In one embodiment, the service provider may determine the appropriate capacity of the network based on a forecast of the network traffic. For example, the service provider may determine that the forecast indicates an increase of the network traffic volume. The change in the network traffic volume may require significant network expansion, e.g., by adding new base stations, antenna sectors, etc. However, the expansion via a cellular spectrum may be too costly. In addition, heavy spectrum utilization may increase congestion and increase the cost of backhauling. Therefore, the service provider may prefer to offload the cellular traffic to alternate networks, e.g., to another wireless network, e.g., Wi-Fi networks. Wi-Fi refers to a class of wireless LAN devices that are based on IEEE 802.11 standards. A Wi-Fi enabled device may access the internet when it is located within a range a wireless LAN connected to the internet. The coverage area of the wireless LAN that is used by the Wi-Fi enabled device is referred to as a hotspot. In other words, a hotspot is a site that offers Internet access over a wireless local area network through the use of a router connected to a link to an Internet service provider.

For example, if the customer endpoint devices are smart phones, the devices may have built-in Wi-Fi capabilities. A user may then use a Wi-Fi service via a Wi-Fi hotspot rather than using a frequency in the cellular spectrum. If the service provider plans to offload some of the cellular traffic to the Wi-Fi network, the service provider may then need to deploy the Wi-Fi hotspots. One approach is to deploy Wi-Fi hotspots based on marketing criteria. However, deploying the Wi-Fi hotspots based on marketing criteria may not provide a cohesive plan. For example, the gaps in coverage in the cellular network may fail to be complimentarily filled-in by the Wi-Fi hotspots, thereby reducing the usefulness of the Wi-Fi hotspot for relieving the cellular network in an optimal manner.

In one embodiment, the current disclosure describes a method for locating a Wi-Fi hotspot for offloading wireless traffic, e.g., cellular traffic in a network. In order to optimally relieve the cellular network, the method first determines busy hour traffic patterns of the sectors in the cellular network being relieved. For example, the traffic pattern of each sector in the area of interest is analyzed to determine the busy hour traffic volume, peak traffic volume, time of day for the busy hour traffic.

For example, the service provider may be interested in deploying Wi-Fi hotspots to relieve the cellular network in a specific geographical area. The method then gathers the network traffic data for the specific geographical area. The network traffic data may then be analyzed to determine the peak traffic volume for each sector and the time at which the peak traffic volume occurs.

In one embodiment, the method then sorts the sectors in the specific geographical area based on their peak traffic volumes, such that the sector associated with the highest peak traffic volume is first on the sorted list of sectors, the sector associated with the second highest peak traffic volume is second on the sorted list, and so on. The sorting continues until the sectors are sorted in accordance with their peak traffic volumes.

In one embodiment, the method then selects one or more sectors to be relieved from the sorted list. For example, the number of sectors to be selected for being relieved can be based on the availability of capital budget for building the Wi-Fi hotspots.

In one embodiment, the method then determines the coverage area of each of the one or more sectors selected to be relieved. The coverage area of a sector may depend on a number of factors, e.g., frequency band, terrain, antenna height, antenna tilt, antenna azimuth, transmitted power level, etc.

In one embodiment, the method then approximates the geographical range of each of the selected sectors by a traffic circle. For an existing sector antenna in a base station that is being relieved, the traffic circle approximates the geographical area that originates its current traffic. For a sector antenna that is not deployed but whose forecasted traffic is being considered for offloading to a Wi-Fi network, the traffic circle approximates the geographical area from where the Wi-Fi network can pick up offload traffic.

The method then obtains potential Wi-Fi locations from a database such that the potential locations are interior to a traffic circle. For example, the database may contain coffee shops, stadiums, hotels, etc. that may be appropriate locations for a Wi-Fi hotspot.

In one embodiment, the method performs further matching of the traffic circle for each selected sector with the type of Wi-Fi location. For example, for each selected sector, the method selects a corresponding location for deploying a Wi-Fi hotspot based on matching the time at which the peak traffic volume occurs to a type of the potential Wi-Fi location. For instance, for a specific selected sector, if the peak time for a selected sector is in the evenings, the hotspot for the Wi-Fi network may be located in a hotel rather than a stadium or a coffee shop. In another example, if the time at which the peak traffic volume occurs is mid afternoon, the method may select a coffee shop. In another example, if the time at which the peak traffic volume occurs is during sporting events, the method may select a stadium location. If the time at which the peak traffic volume occurs is around lunch or dinner time, the method may select a restaurant location. The selected sector may then be relieved by offloading the traffic to the Wi-Fi network, via a Wi-Fi hotspot implemented at the selected location.

Figure 3:
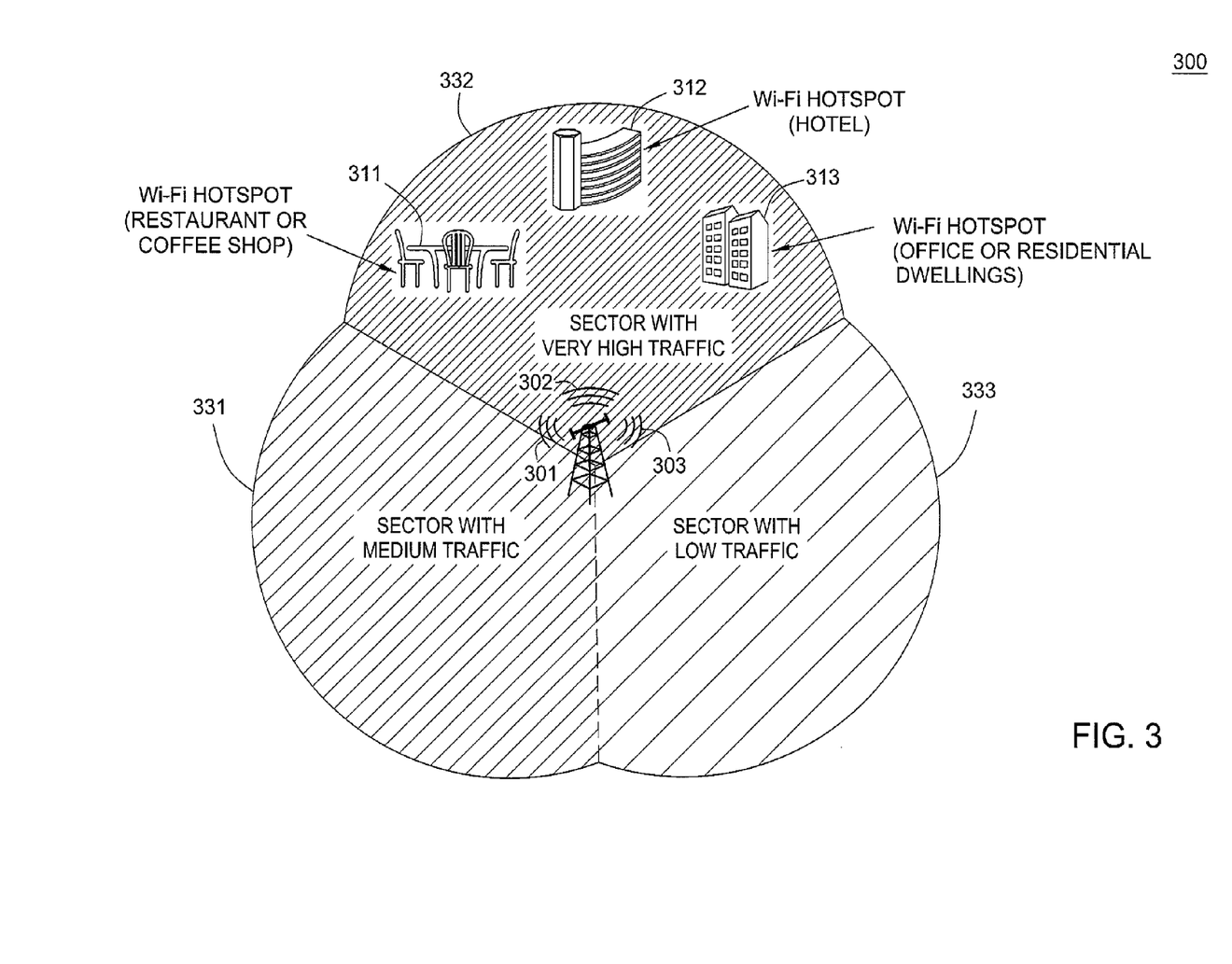
FIG. 3 illustrates an exemplary base station.

FIG. 3 illustrates an exemplary base station 300. For example, the base station 300 may be in a specific geographical area targeted by the service provider for being an appropriate location for relieving the cellular network via one or more Wi-Fi hotspots. In this example, the base station 300 comprises sectors 301-303. Each sector has a specific geographical range. The geographical ranges 331-333 illustrate the geographical reaches of the sectors 301-303, respectively. The method then gathers the network traffic data for the specific geographical area. The network traffic data may then be analyzed to determine the peak traffic volume for each of the sectors 301-303 and the time at which the peak traffic volume occurs.

In one embodiment, the method then sorts the sectors 301-303 based on their peak traffic volumes, such that the sector associated with the highest peak traffic volume is first on the sorted list of sectors. The sector associated with the second highest peak traffic volume is second on the sorted list, and so on. For example, sectors 301, 302 and 303 may have medium, high and low traffic volume, respectively. The method then selects one or more sectors to be relieved from the sorted list. For example, Sector 302 may be selected for being relieved.

In one embodiment, the method then determines the coverage area of sector 302. The method then approximates the geographical range of sector 302 by a traffic circle. The method then obtains a list of potential Wi-Fi locations from a database such that the potential locations are interior to the traffic circle of sector 302. For example, potential Wi-Fi hotspot locations 311-313 are located in the coverage area of sector 302. To illustrate, the potential hotspot locations 311-313 comprise a restaurant or coffee shop 311, a hotel 312 and a location near an office or residential dwellings 313, respectively.

The method then performs further matching of the traffic circle of sector 302 with a type of potential Wi-Fi location that would be most useful. For example, if the time at which the peak traffic volume occurs is in the evenings, the method may select a lobby of a hotel 312. In another example, if the time at which the peak traffic volume occurs is mid afternoon, the method may select the coffee shop 311, and so on. The Wi-Fi hotspot is then implemented in the selected location. For example, the service provider may implement the wireless LAN at the selected location and connect the wireless LAN to the internet. The sector 302 may then be relieved by dynamically offloading the traffic to the Wi-Fi network.

In the above determination of the range of the antenna, the tilt angle of the antenna was used in equation (1). However, in some scenarios the tilt angle may either be unavailable or set to zero. In one embodiment, the current method provides another method of estimating the range d from the transmitted power of the base station as follows:

Let, X: Transmitted power of the base station in dB;
Y: An estimate of the received signal strength in dB determined using a Hata-Okamura wireless signal propagation model of equation (5), provided below;
f: Carrier frequency of base station antenna in Mhz;
h: Height of the antenna in meters; and
d: range of the antenna in meters.

The default values for the parameters in the Hata-Okamura wireless signal propagation model (on the dB scale) are:
A=69.55 (for f=900 Mhz) and A=46.30 (for f=1800 Mhz);
B=26.16 (for f=900 Mhz) and B=33.90 (for f=1800 Mhz);
C=−13.82; D=44.90; and E=−6.55.

Then, $$Y = X - A - B\log(f) - C\log(h) - (D + E\log(h)) \cdot \log(d/1000). \quad (5)$$

Therefore, if $Y_{min}$ is a minimum limit on the received signal strength (e.g., −120 dB), then the range of antenna (d) in meters is given by:

$$d = 1000 \times 10^{\wedge} \left\{ \frac{X - A - B\log(f) - C\log(h) - Y}{D + E\log(h)} \right\}. \quad (6)$$

In one embodiment, the current method combines the above two ways of estimating d as follows:

$$d = \mathrm{Min}\left[ h\mathrm{Cot}(\tau - \theta/2), 1000 \times 10^{\wedge} \left\{ \frac{X - A - B\log(f) - C\log(h) - Y}{D + E\log(h)} \right\} \right] \quad (7)$$

The method then uses equations (1) to (3) to determine the $(X_{TC}, Y_{TC}, r)$.

Figure 4:
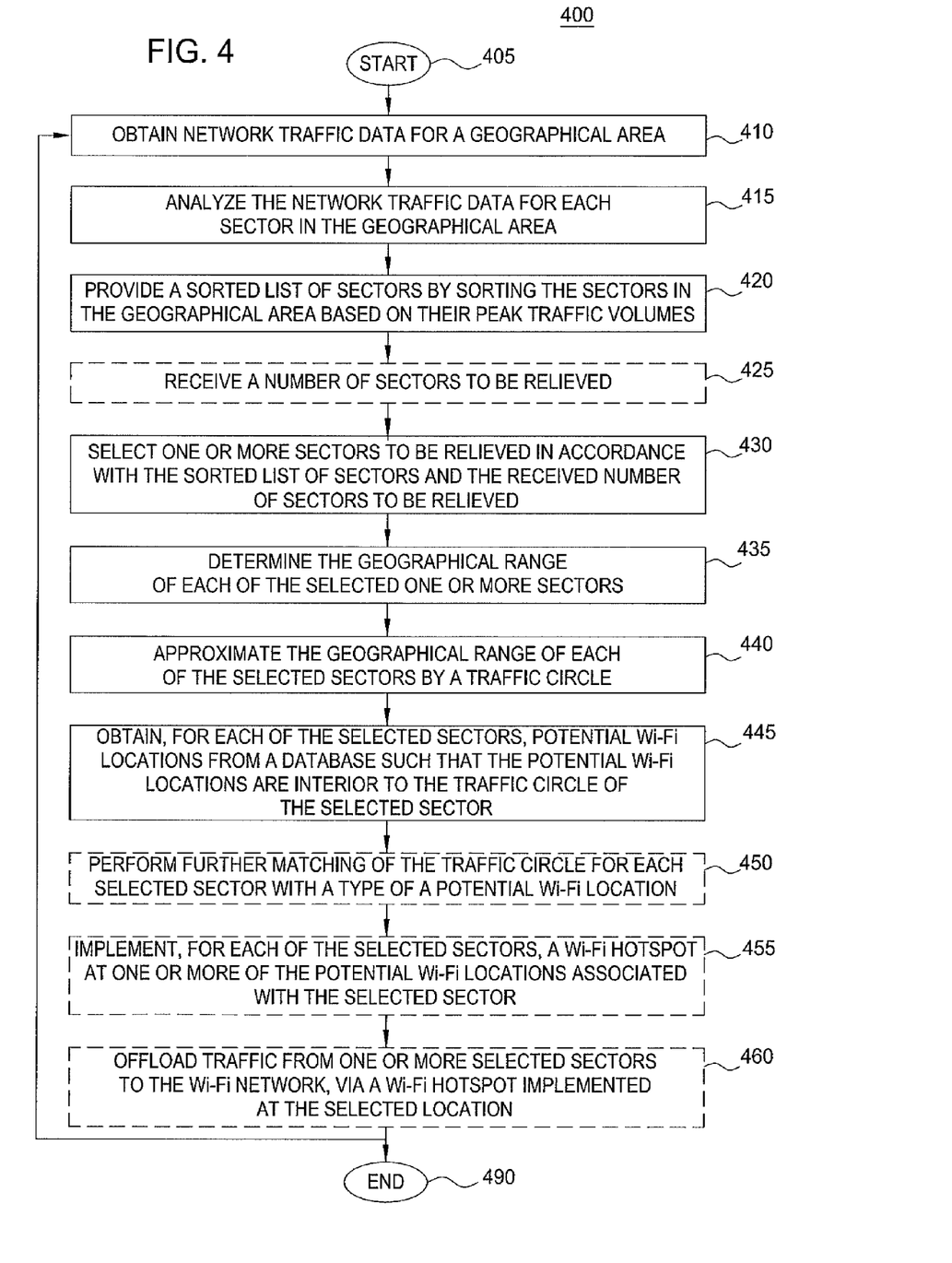
FIG. 4 illustrates a flowchart of the method for locating a Wi-Fi hotspot for offloading cellular traffic.

FIG. 4 illustrates a flowchart of the method 400 for locating a Wi-Fi hotspot for offloading cellular traffic. The method for locating a Wi-Fi hotspot can be implemented in a server located in the service provider's network. For example, the method may be implemented in application server 112 deployed in core network 110 as shown in FIG. 1. Method 400 starts in step 405 and proceeds to step 410.

In step 410, method 400 obtains network traffic data for a geographical area. For example, the service provider may have selected a geographical area for a capacity expansion, upgrade, etc. For example, one or more base stations may be selected for capacity expansion.

In step 415, method 400 analyzes the network traffic data for each sector in the geographical area. For example, the network traffic data may be analyzed to determine, for each sector, the peak traffic volume and the time at which the peak traffic volume occurs.

In step 420, method 400 provides a sorted list of sectors by sorting the sectors in the geographical area based on their peak traffic volumes. For example, the method may sort the sectors, such that the sector associated with the highest peak traffic volume is first on the sorted list of sectors. The sector associated with the second highest peak traffic volume is second on the sorted list, and so on.

In optional step 425, method 400 obtains a number of sectors to be relieved. For example, the service provider may have a budget for relieving one sector, two sectors, etc. In one embodiment, the number of sectors to be relieved is based on the availability of capital budget for building the Wi-Fi hotspots, the forecast data, etc. In another embodiment, the number of sectors to be relieved may be pre-determined or pre-set by the service provider. For example, the service provider may set the number of sectors to be relieved to one sector, two sectors, etc.

In step 430, method 400 selects one or more sectors to be relieved in accordance with the sorted list of sectors and the number of sectors to be relieved as conveyed in step 425. The number of sectors may be obtained in step 425 or, in alternate embodiment, the number may be pre-determined. In one example, the number of sectors to be relieved is one. The method then selects the sector associated with the highest peak traffic volume in the geographical area as the sector to be relieved. In another example, if the number of sectors to be relieved is two, the method selects the two sectors associated with the two highest peak traffic volumes in the geographical area.

In step 435, method 400 determines the geographical range (coverage area) of each of the selected one or more sectors. For example, the method may obtain the physical characteristics of the antennas from a database. The coverage area for each antenna may then be determined from the physical characteristics. For example, the database may include, coordinate location of the antenna in the base station, azimuth of the antenna, transmitted power levels of antennas, height of the antenna, vertical beam width of the antenna, tilt angles of the antenna, minimum limit on the received signal strength, terrain, carrier frequency of base station antenna, etc.

In optional step 440, method 400 approximates or represents the geographical range of each of the selected sectors by a traffic circle. For example, the method determines the geographical range, the radius of the traffic circle, the Cartesian coordinate location of the center of the traffic circle, and the circular coordinate of the sector using one or more of equations (1) to (7). The traffic circle may be approximated using equations (1), (6) or (7) based on which physical characteristics are available.

For example, if the tilt angle for the antenna is provided, the method may use equation (1) to approximate the geographical range d. If the tilt angle is not available but the transmitted power level, the minimum limit on the received signal strength, and the carrier frequency are known, the method may use equation (6). If both the tilt angle and the power levels are available, the method may use equation (7) and so on.

In step 445, method 400 obtains, for each of the selected sectors, potential Wi-Fi locations from a database such that the potential Wi-Fi locations are interior to the traffic circle of the selected sector. For example, the potential Wi-Fi locations for a specific sector may be a list of structures, e.g., coffee shops, restaurants, stadiums, hotels, office buildings, residential buildings, and the like that are located in the traffic circle of specific sector.

In an optional step 450, method 400 performs further matching of the traffic circle for each selected sector with a type of a potential Wi-Fi location. For example, for a specific selected sector, the method selects a corresponding location for deploying a Wi-Fi hotspot based on matching the time at which the peak traffic volume occurs to a type of the potential Wi-Fi location. For instance, if the peak traffic volume for the selected sector occurs in the evenings, the matching of the traffic circle with the types of potential Wi-Fi locations in the traffic circle may result in a selection of a hotel lobby as the hotspot for the Wi-Fi network. In another example, if the time at which the peak traffic volume occurs is mid afternoon, the matching of the traffic circle with the types of potential Wi-Fi locations in the traffic circle may result in a selection of a coffee shop as the hotspot for the Wi-Fi network.

In an optional step 455, method 400 implements or schedules a deployment, for each of the selected sectors, a Wi-Fi hotspot at one or more of the potential Wi-Fi locations associated with the selected sector. For example, if further matching of the traffic circle with types of the potential Wi-Fi locations is performed, the method may implement the Wi-Fi location in accordance with the matching. In another example, if optional step 450 is not applicable, the method may implement the Wi-Fi hotspots based on other considerations, e.g., cost of space for the wireless LAN equipment, ease of access, etc.

Furthermore, in one alternate embodiment, if the Wi-Fi hotspots are existing hotspots, e.g., operated by another business entity (e.g., a hotel chain, a coffee house chain) or another service provider, then the present method can be adapted to simply offload the cellular traffic to the existing hotspots, e.g., via an agreement with the business entity or the other service provider.

In an optional step 460, method 400 offloads traffic from one or more selected sectors to the Wi-Fi network, via a Wi-Fi hotspot implemented at the selected location. The method then proceeds to step 490 to end processing the current network traffic data or to returns to step 410 to obtain more network traffic data.

It should be noted that although not specifically stated, one or more steps of method 400 may include a storing, displaying and/or outputting step as required for a particular application. In other words, any data, records, fields, and/or intermediate results discussed in the method 400 can be stored, displayed and/or outputted to another device as required for a particular application.

Figure 5:
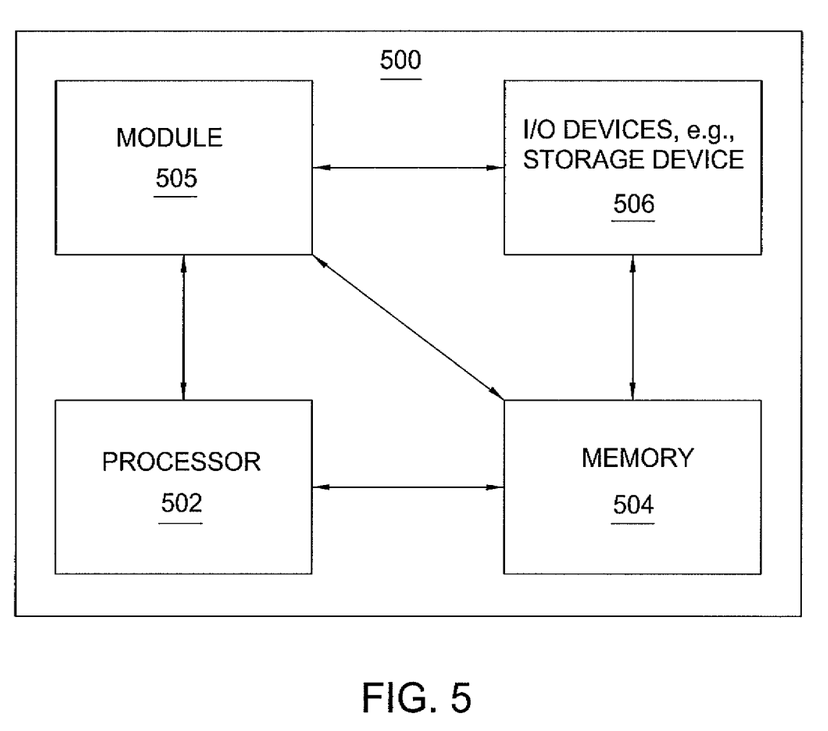
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for locating a Wi-Fi hotspot for offloading cellular traffic in a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 505 for locating a Wi-Fi hotspot for offloading cellular traffic in a network can be loaded into memory 504 and executed by processor 502 to implement the functions as discussed above. As such, the present method 505 for locating a Wi-Fi hotspot for offloading cellular traffic in a network (including associated data structures) of the present disclosure can be stored on a non-transitory computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for locating a hotspot of a first type of wireless access network for offloading wireless traffic from a second type of wireless access network, comprising:
   obtaining, by a processor, network traffic data for the second type of wireless access network for a geographical area;
   obtaining, by the processor, a list of sectors of a plurality of base stations in the geographical area, wherein the network traffic data includes a peak traffic volume for each of the sectors in the list of sectors;
   selecting, by the processor, a sector from the list of sectors to be relieved, wherein the sector that is selected is a sector having a highest peak traffic volume;
   determining, by the processor, a geographical range for the sector;
   obtaining, by the processor, the hotspot within the geographical range, wherein the obtaining the hotspot comprises:
      performing a matching of the geographical range for the sector with a plurality of potential hotspot locations of the first type of wireless access network that are within the geographic range; and
      scheduling a deployment of the hotspot in one of the plurality of potential hotspot locations; and
   offloading, by the processor, the wireless traffic from the sector to the first type of wireless access network via the hotspot.

2. The method of claim 1, wherein the first type of wireless access network comprises a Wi-Fi network.

3. The method of claim 2, wherein the second type of wireless access network comprises a cellular network.

4. The method of claim 1, wherein the geographical range is represented via a traffic circle.

5. The method of claim 1, wherein the list of sectors is obtained and organized based on the peak traffic volumes for each of the sectors.

6. The method of claim 4, wherein the obtaining the hotspot comprises:
   performing a matching of the traffic circle associated with the sector with a plurality of potential hotspot locations of the first type of wireless access network that are interior to the traffic circle.

7. The method of claim 1, wherein the geographical range of the sector is determined in accordance with physical characteristics of an antenna at a base station of the sector.

8. The method of claim 7, wherein the physical characteristics of the antenna comprises a tilt angle of the antenna.

9. The method of claim 7, wherein the physical characteristics of the antenna comprises a transmitted power level of the antenna.

10. The method of claim 7, wherein the physical characteristics of the antenna comprise a tilt angle of the antenna and a transmitted power level of the antenna.

11. A non-transitory computer-readable medium storing instructions which, when executed by a processor, cause the processor to perform operations for locating a hotspot of a first type of wireless access network for offloading wireless traffic from a second type of wireless access network, the operations comprising:
   obtaining network traffic data for the second type of wireless access network for a geographical area;
   obtaining a list of sectors of a plurality of base stations in the geographical area, wherein the network traffic data includes a peak traffic volume for each of the sectors in the list of sectors;
   selecting a sector from the list of sectors to be relieved, wherein the sector that is selected is a sector having a highest peak traffic volume;
   determining a geographical range for the sector; and
   obtaining the hotspot within the geographical range, wherein the obtaining the hotspot comprises:
      performing a matching of the geographical range for the sector with a plurality of potential hotspot locations of the first type of wireless access network that are within the geographic range; and
      scheduling a deployment of the hotspot in one of the plurality of potential hotspot locations; and
   offloading the wireless traffic from the sector to the first type of wireless access network via the hotspot.

12. The non-transitory computer-readable medium of claim 11, wherein the first type of wireless access network comprises a Wi-Fi network.

13. The non-transitory computer-readable medium of claim 12, wherein the second type of wireless access network comprises a cellular network.

14. The non-transitory computer-readable medium of claim 12, wherein the geographical range is represented via a traffic circle.

15. The non-transitory computer-readable medium of claim 12, wherein the list of sectors is obtained and organized based on the peak traffic volumes for each of the sectors.

16. The non-transitory computer-readable medium of claim 14, wherein the obtaining the hotspot comprises:
   performing a matching of the traffic circle associated with the sector with a plurality of potential hotspot locations of the first type of wireless access network that are interior to the traffic circle.

17. An apparatus for locating a hotspot of a first type of wireless access network for offloading wireless traffic from a second type of wireless access network, comprising:
   a processor; and
   a computer-readable medium storing instructions which, when executed by the processor, cause the processor to perform operations, the operations comprising:
      obtaining network traffic data for the second type of wireless access network for a geographical area;
      obtaining a list of sectors of a plurality of base stations in the geographical area, wherein the network traffic data includes a peak traffic volume for each of the sectors in the list of sectors;
      selecting a sector from the list of sectors to be relieved, wherein the sector that is selected is a sector having a highest peak traffic volume;
      determining a geographical range for the sector; and
      obtaining the hotspot within the geographical range, wherein the obtaining the hotspot comprises:
         performing a matching of the geographical range for the sector with a plurality of potential hotspot locations of the first type of wireless access network that are within the geographic range; and
         scheduling a deployment of the hotspot in one of the plurality of potential hotspot locations; and
      offloading the wireless traffic from the sector to the first type of wireless access network via the hotspot.

* * * * *